US009774987B2

(12) United States Patent
Wuts

(10) Patent No.: US 9,774,987 B2
(45) Date of Patent: Sep. 26, 2017

(54) METHOD OF, AND A COMPUTER PROGRAM PRODUCT FOR SHARING DIGITAL MEDIA SUCH AS PHOTOS AND/OR VIDEOS BETWEEN A PLURALITY OF MOBILE COMMUNICATION DEVICES

(71) Applicant: The Fun Fellows B.V., Roermond (NL)

(72) Inventor: Roderik Arjen Wuts, Roermond (NL)

(73) Assignee: THE FUN FELLOWS B.V., Roermond (NL)

( * ) Notice: Subject to any disclaimer, the term of this patent is extended or adjusted under 35 U.S.C. 154(b) by 0 days.

(21) Appl. No.: 15/149,332

(22) Filed: May 9, 2016

(65) Prior Publication Data
US 2016/0330574 A1 Nov. 10, 2016

(30) Foreign Application Priority Data
May 7, 2015 (NL) .................................... 2014780

(51) Int. Cl.
*H04B 7/00* (2006.01)
*H04W 4/00* (2009.01)
(Continued)

(52) U.S. Cl.
CPC ............ *H04W 4/008* (2013.01); *G06F 21/10* (2013.01); *H04L 67/1095* (2013.01);
(Continued)

(58) Field of Classification Search
CPC ..... H04W 84/18; H04W 88/06; H04W 76/02; H04W 8/245; H04W 24/02; H04W 88/02;
(Continued)

(56) References Cited

U.S. PATENT DOCUMENTS

2013/0117365 A1* 5/2013 Padmanabhan ....... H04W 4/206
709/204
2013/0297690 A1* 11/2013 Lucero ................... G06Q 50/01
709/204

OTHER PUBLICATIONS

Nirmal Patel et al."Mobiphos: A study of user engagement with a mobile collocated-synchronous photo sharing application", Int. J. Human-Computer Studies, pp. 1048-1059, vol. 67 (Sep. 2009).
(Continued)

*Primary Examiner* — Nhan Le
(74) *Attorney, Agent, or Firm* — Browdy and Neimark, P.L.L.C.

(57) ABSTRACT

A method of sharing digital media such as photos and/or videos between mobile communication devices and a computer program product for sharing such digital media. Each device includes a camera module, a non-volatile flash memory module for storing the digital media, and the mobile communication devices are included in a media share group including at least a first and further mobile communication device. The method includes, by the first mobile device, establishing a connection with the further mobile device by a wireless personal area network, determining that the further mobile device is included in the media share group, defining a selection of the digital media, wherein the selection includes digital media not present on the non-volatile flash memory of the further mobile device and the digital media is generated by the camera module of the first mobile device within a predefined time period, and copying the selection of the digital media towards the further mobile device.

21 Claims, 2 Drawing Sheets

(51) Int. Cl.
*H04W 76/02* (2009.01)
*H04L 29/08* (2006.01)
*G06F 21/10* (2013.01)
*H04W 12/08* (2009.01)

(52) U.S. Cl.
CPC ... *H04W 76/025* (2013.01); *G06F 2221/0706* (2013.01); *H04W 12/08* (2013.01)

(58) Field of Classification Search
CPC ......... H04M 2250/02; H04M 1/72525; H04M 1/72522
USPC ....... 455/41.2, 418–420, 422.1, 431.1, 435.1
See application file for complete search history.

(56) References Cited

OTHER PUBLICATIONS

Nirmal J. Patel et al."A Study of Cultural Effects on Mobile-Collocated Group Photo Sharing", College of Computing and GVU Center & Samsung Advanced Institute of Technology, pp. 1-10, (Nov. 2010).
ThinkDifferent, "Instashare Makes File Sharing Easy Between iOS Devices and OS X Via Bluetooth/WiFi" pp. 1-8 (Mar. 2013).
Carl Parker, "How to use S Beam", AndroidAuthority, pp. 1-14 (Mar. 2013).

* cited by examiner

METHOD OF, AND A COMPUTER PROGRAM PRODUCT FOR SHARING DIGITAL MEDIA SUCH AS PHOTOS AND/OR VIDEOS BETWEEN A PLURALITY OF MOBILE COMMUNICATION DEVICES

FIELD OF THE INVENTION

The present invention relates to a method of sharing digital media such as photos and/or videos between a plurality of mobile communication devices. The present invention further relates to a computer program product for sharing such digital media.

BACKGROUND

Mobile communication devices such as mobile phones and tablets have become a fact of everyday life. Vast groups of people own a mobile phone and use it on daily or even hourly basis. Most of these mobile phones nowadays are smartphones. Smartphones can be defined as a mobile communication device in the form of a mobile phone with advanced processing power and a versatile advanced mobile operating system running thereon. This enables employment of a plurality of features such as, but not restricted to, media player functionality, global positioning system functionality, camera's, applications, etc. In fact, modern smartphones can be considered mobile computers arranged for performing both speech and data communication over any one or more of cellular networks, local area networks, wide area networks, internet, etc. Modern smartphones have processing power equal to conventional personal computers, and as such have huge technical potential.

Tablets are also mobile communication devices with capabilities similar to those of smartphones. Although the definition of a tablets is not standardized it can be considered as having a larger display than that of a smartphone and lacks cellular network communication support. Wherein in the present application mobile communication device is mentioned, a smartphone, tablet or the like is meant.

Mobile communication devices such as smartphones and tablets have in common that they comprise at least a communication module for local and wide area communication and a camera module for making photos and/or videos. These photos and videos are considered digital media and can be stored in the device on an internal storage medium such as a non-volatile flash memory. This internal storage medium can be an integral part of the device, e.g. it can not be taken out of the device, or it can be provided in the form of a non-volatile memory card that can be removed from the device and read/written in other devices.

Since these mobile communication devices have become commonplace for most people, the amount of photo's taken by these devices increases rapidly. It is even increasingly common for a single person to own multiple mobile communication devices such as one or more tablets, smartphones, and the like. Many people that own multiple devices, or even share devices for example within a family, often have the desire to access digital media from one device that is stored locally on a different device Thus for example, a person owns both a smartphone and a tablet but wants to view a series of photos on the tablet while the photos are taken with the smartphone and stored locally on the internal storage medium of the smartphone. In another example a friend or relative of the first person owning at least one of these devices wants to view the series of photos on their own smartphone while the photos are stored on the internal storage medium of the smartphone of the first person.

To solve these problems, it is known in the art to share the photos via telecommunication mediums such as the internet. The first person, being the owner of the tablet on which the series of photos are located can email the photos to the second person such that he or she can view them from their own device. This however has several drawbacks. First of all, both devices need to be able to communicate over a telecommunication network such as the internet. Secondly, the telecommunication network needs to be available, not all areas have good coverage. And thirdly, applications such as email often have file size restrictions that are insufficient to transfer videos, high resolution photos, or series of photos and/or videos. Web services by which larger file sizes can be transferred also have restrictions and require telecommunication network availability, bandwidth and server resources, which are all limited. Moreover, not all mobile operating systems running on mobile devices are directly compatible with these services. For most mobile devices a computer is required which is to be used as intermediate download terminal, from which terminal the files can be synchronized with a mobile device.

The coverage of for example some cellular networks in some countries is far from 100%. Moreover, indoor coverage is often far from 100% either. If a person is not connected with their home base station, if the person is for example abroad, network roaming will significantly add up to the expenses charged by the telecom provider. Since digital media like photos and videos in particular are of large size, the roaming costs for sharing content over a telecommunication network when being abroad will increase rapidly. Moreover, some mobile communication devices such as a tablet are often not arranged to communicate over mobile cellular networks. These tablets require a Wi-Fi connection to connect with the internet. This in turn require availability of a public Wi-Fi network which is far for common in most countries and regions. Moreover, users that want to share their digital content from a joint (social) activity, are mostly in close proximity of each other during the joint activity. This is often a location in which either telecommunication network is limited or absent, e.g. on the piste during a ski activity, or wherein bandwidth is limited, e.g. during a festival. Hence, establishing a connection with the other users of the joint activity can be very difficult.

Yet a further disadvantage of known photo or video sharing applications that use the internet a file sharing platform, e.g. photo sharing on a cloud based application, is that these applications require comprehensive registration processes. In order to determine whether a user of a mobile communication device is allowed to upload photos to the cloud based share, the user has to be registered. For the registration and subsequent authentication, the user must often fill in personal information on the website. Besides the fact that such a registration process forms a barrier for the use of the application, it is also undesirable from a privacy point of view. Moreover, since the photo's and video's are stored on the cloud storage, the users often, by accepting the end user license agreement, waive their copyrights.

In view of the large and ever increasing amounts of digital media generated and conveyed by telecommunications networks nowadays, optimization in terms of data capacity at the networks itself on the one hand, and availability and flexibility of digital media on the other hand becomes more and more important.

SUMMARY OF THE INVENTION

It is an object of the present invention to obviate at least some of the above mentioned disadvantages of the prior-art.

It is a further object of the present invention to provide an improved method of sharing digital media, such from a telecommunications network availability and footprint, e.g. bandwidth point of view, which improved method is easy to use and to a large extent automated.

It is yet a further object of the present invention to provide a method of sharing digital media with a low telecommunications network capacity footprint which is easy to use and automated which does not require comprehensive registration processes and/or waiving of copyrights to the files being shared.

In a first aspect a method is provided of sharing digital media between a plurality of mobile communication devices each comprising a camera module, wherein the digital media is a photo and/or video stored on a non-volatile flash memory module of any one of the plurality of mobile communication devices, wherein the plurality of mobile communication devices are comprised in a media share group at least comprising a first and further mobile communication device, the method comprising the steps of:

establishing, by the first mobile communication device, a connection with the further mobile communication device by means of a wireless personal area network;

determining, by the first mobile communication device, that the further mobile communication device is comprised in the media share group;

defining, by the first mobile communication device, a selection of the digital media, wherein the selection is comprised of digital media not present on the non-volatile flash memory of the further mobile communication device and the digital media being generated by the camera module of the first mobile communication device within a pre-defined time period;

copying, by the first mobile communication device, the selection of the digital media towards the further mobile communication device.

As explained above, the large and ever increasing amounts of digital media generated by a large and ever increasing amount of mobile communication devices such as smartphones and tablets, and the desire to make all digital media available via all of these mobile communication devices puts enormous pressure on limited telecommunication network and telecommunication server resources, especially in areas in which there is a large demand for sharing content, but wherein the telecommunication network availability is either absent or limited and if available, bandwidth is limiting factor.

Prior art solutions for the desire of availability of all digital media at any place on any device are directed to transferring a copy of the digital media between user via the internet, e.g. on site at a joint activity. The available storage size and bandwidth is however restricted. Most applications running on mobile devices such as email applications apply file size restrictions that are not sufficient for digital media sharing. Remote web services have storage and often bandwidth restrictions due to the simple fact that the telecommunication network bandwidth and server resources aren't unlimited.

Known methods are arranged to make local copies, increase compression or transcode the media into a file with a different compression and transfer these files with reduced size to the other devices. Methods that are arranged to make copies in the original file resolution format such that image and/or video quality is not reduced however have the drawback of putting high pressure on limited telecommunication network and server resources.

Local alternative solutions are known in the form of wired communication channels by which the digital media can be copied without quality loss. These methods however require a personal computer or laptop as intermediate device between for example a smartphone and tablet. The smartphone and tablet cannot be connected directly for direct content sharing via a wired connection. In the event that digital media is to be shared between multiple devices, this method is cumbersome.

Yet another method known is to use an alternative intermediate device then a personal computer or smartphone, such in the form of a remote server, via an internet connection, i.e. to store the photos and videos of the smartphone and tablet in "the cloud". This however again puts high pressure on limited telecommunication network and server resources and moreover it requires an internet connection, vast amounts of storage capacity "in the cloud", and all sorts of personal information stored there enable use of the cloud based sharing application. In remote (rural) areas, some indoor locations and less developed countries such an internet connections is not commonplace. Maybe even more important, use of an internet connection outside the country of origin is often only available at high (roaming) costs. Thus use of such an internet connection when being abroad for transferring high amounts of original high quality photos and in particular videos will result in a high bill charged by the telecommunication provider.

If, as an alternative, users would wait with sharing the content until they are within reach of an internet connection that does not have such restrictions, e.g. back home after the joint activity, or maybe even in a hotel with "free WiFi", the problem arises that it is hard to determine which content to share, i.e. what content was generated during the joint activity. Moreover, even when "unlimited/unrestricted" internet is available, and when the user even has made the effort to determine which content is to be shared and was generated during the joint activity, sharing that content would still require known sharing methods like via email, with the disadvantages indicated above, or via cloud based sharing applications, also with known disadvantages as indicated, e.g. requiring often limited remote storage space, elaborate registration processes and leaving behind personal (private) information. And finally, often also under a provision that copyrights are waived.

Moreover, known methods, and in particular local methods of local connections between devices directly, e.g. via a wired connection or via a local wireless connection, are not arranged to share digital media between three or more devices. These methods are directed to provide a copy directly between two local devices.

The inventor of the present invention however came to the insight that mobile communication devices are equipped with local wireless personal area network modules to communicate over a wireless personal area network such as Bluetooth™. Bluetooth™ is a wireless standard for exchanging data over short distances using short-wavelength UHF radio waves in the ISM band between 2.4 and 2.485 GHz. Bluetooth™ can be used between mobile communication devices and was originally conceived as a wireless alternative to the RS-232 data cable connection used to communicate data between two devices. Bluetooth™ is a wireless technology standard for exchanging data over short distances using short-wavelength UHF radio waves in the ISM band from 2.4 to 2.485 GHz With the present invention a method is provided to share digital media between a plurality of mobile communication devices that are equipped with a camera module. Common examples of such devices are tablets and smartphones but similar devices or hybrid devices are also suitable. These devices comprise at least a module for communicating with a network, i.e. a cellular network and/or a wireless 801.11 network, and a module for making photos and videos, i.e. a camera module, and a memory module, i.e. a non-volatile flash memory module or the like, which is nowadays present in mobile communication devices such a tablets and smartphones and used as local storage device.

The digital media is shared as explained, between a plurality of mobile communication devices. These devices are part of a media share group and comprise in its most simple embodiment two devices. The amount of devices in the group is however unlimited. Since the sharing between the devices takes place on a copy in stead of a synchronization basis, i.e. between two devices, one devices is considered the master, the other the slave or target. The digital media is copied from the master towards the slave (target). In the present invention first mobile communication devices is denoted for master and further mobile communication device for slave or target device. Contrary to synchronizing wherein both devices have equal privileges and coping takes place in two directions, i.e. from the first to the further devices and vice versa, in the present invention the coping takes place as one-way traffic. The digital media is copied from the first device to the further and not the other way round.

Prior to coping the digital media a connection has to be established between the first and further mobile communication device. This connection is made via a wireless personal area network, e.g. via a Bluetooth™ connection. The actual step of copying the digital media, e.g. copying the selection of said digital media from and by the first mobile communication device towards the further mobile communication device, can be performed either over a wireless personal area network, or over a different type of network like a wireless local area network, a mobile telecommunications network, e.g. 3G, 4G or further generation packet switched cellular data network, Once two devices have authorized each others connection, the first and further devices can connect automatically once they are within the range of the wireless personal area network, e.g. for Bluetooth™ connections that range is approximately 10 meters. Once authenticated, often called paired in the case of Bluetooth™, the first and further device connect with each other when within range. By connecting via Bluetooth™ the requirement of availability of a cellular network or internet coverage has become obsolete. Thus there is no dependence of the availability of these networks and the steps of establishing the connection between the first and second device as well as determining the selection and optionally the actual copying is all performed without delay and without user interaction, thus by an automated process performed by the first device. Without delay is defined as the users of the media sharing method not having to wait for the devices to connect to a telecommunication network but the method already starts copying the media once the devices come within each others wireless personal area network range. In an alternative, the actual copying can also be performed over a public telecommunication network, e.g. WiFi, 3G, 4G, etc. In such an alternative, the actual copying can take place following the joint activity when internet access is available, and the pairing can take place during the joint activity, when users are physically within reach of each other.

Once the two devices have connected with each other, the master, i.e. the first mobile communication device can determine if the slave/target, i.e. the further mobile communication device, belongs to the media share group and thus if all digital media not yet present on the further device should be copied accordingly, all on an automated basis, without user interaction being required If the further device belongs to the media share group the first device defines a selection of digital media which needs to be copied to the further device. This selection comprises only digital media that is present on the non-volatile internal memory of the first device and hence not media made available via a remote share (for example data available in the cloud). Moreover, the digital media is not only stored locally on the device, the selection is also restricted to digital media that is generated locally, i.e. by the camera unit of the first device, thus not media received from others.

An advantage of the authentication of the first and further mobile communication devices through a local, wireless personal area network is that such an authentication is location specific. Thus can be defined by users with their devices that are in the same place at the same time. An example thereof are users that engage in a social activity with each other, i.e. vacation, a short trip, or the like.

Contrary to conventional authentications between devices, which is performed through a public network like a wireless (local) area network or a mobile cellular network like 3G/4G, these wireless personal area networks are non-public and personal. To some extent, the wireless personal area network and wireless local area are complementary in their applications and usage. However, where wireless local area networks are networks with a star network topology which communicate in an asymmetrical client-server oriented manner through a central access point like a router, wireless personal area networks are networks with a point-to-point or mesh network topology which communicate an a symmetrical master-slave oriented manner. As such, wireless personal area networks are restricted and able to provide simple secure communication between two devices through a simple and minimal configuration, e.g. by Bluetooth™ pairing.

Accordingly, by the method according to an example of the invention, wherein the authentication between the devices takes place through a wireless personal area network in stead of a wireless local area network, the authentication, hence pairing or handshake, between the two devices is provided in a simple, robust manner which location dependent, thus very suitable for users that engage in a joint (social) activity or at least users that are in close proximity of each other. Moreover, due to the simple authentication, no registration is required on a remote server/cloud service, which registration can incur waiving copyrights. Authentication can be performed without registration of personal information but by use of the application specific authentication methods present in wireless personal area networks such as Bluetooth™.

Once two devices have established a connection, the devices are paired. The pairing information, e.g. the Bluetooth™ pair keys(s) can be stored remotely in a central server. Preferably, this is the only remote storage of the application, hence, no further, personal information is stored, by which privacy is assured. However, in an example, wherein the actual copying of the digital content is performed over a (wireless) local area network, or public cellular network or the like, the digital content can be stored temporarily on the central server, for example for a predetermined period of time like 7 days. During this time period other users, i.e. one or more of the further devices, can obtain the digital media shared by the first device through the application. Preferably, the maximum duration before the digital media is removed from the central server can be set through a configuration setting in the application running on the device. Once the maximum duration for the digital media has lapsed, the media is removed automatically from and by the server.

Preferably, the digital media stored on the first device and belonging to the selection is not only obtained or directly accessed from the standard storage location in the operating system of the mobile communication device, but is also stored at the further device directly into the standard storage location in the operating system of that further device.

Known media share applications provide synchronisation of content through a separate storage location within the operating system, not integrated within the standard location of the operating system itself. Known operating systems for mobile communication devices like iOS™ and Android™ have central library, which forms part of the core application of the operating system. In iOS™ this is called the Camera Roll, and Android™ has a similar central library. The Camera Roll contains all pictures and video's created by the camera module of the device. In an example of the present invention, the digital media that is copied, is obtained directly from the Camera Roll of the first device, and added to the Camera Roll of the further device.

Since the method is in particular directed to sharing digital media between friends, family, relatives etc. for example when they are together on a holiday, the digital media that is to be shared needs to have a restriction with respect to a time span. Thus, the selection is also limited by a predefined time period, e.g. the time period of the joint holiday.

Once the connection is established and the selection is defined the coping can take place, either over a personal or over a public network (e.g. Bluetooth vs. WiFi/3G/4G). The first devices copies the selection of digital media to the second device over the same wireless personal area network as where the prior connection was established, e.g. via the Bluetooth™ connection, or over a public network following the joint activity.

With such a method two or more users can share the holiday photos and videos in an easy, flexible and substantially automated manner, without the need of elaborate registration processes with are often non-optimal from a privacy and copyright point of view.

If a group of people decides to undertake a joint activity, where there are several people within the group who own a smartphone or tablet, the invention provides a method by which all pictures and videos of the joint activity can be shared in a simple and automated manner. Thereby it firstly is not relevant who takes the photos or videos, and secondly, there is no need to worry about the mutual exchange of the photos and videos during or after the joint activity. All this can be achieved in the absence of any telecommunications network such as a mobile cellular network or Internet connection and all people within the group will have an identical collection of media without delay, or the actual copying takes place afterward over a public telecommunication network.

In a further example the step of copying is performed by means of the wireless personal area network. In this example the wireless personal area network, which preferably is a Bluetooth™ network, is used for both establishing the connection between the first and further device, and for the actual step of copying the selection of digital media. Thus no other communication modules of both devices are required and no availability of these other telecommunication networks such as mobile cellular networks or an internet connection or wireless local area network is required.

In a further example the step of copying is performed by means of a wireless local area network. Alternatively, the actual step of copying can also be performed over a non-private or personal network like Bluetooth™, but over a public telecommunications network, like a (wireless) local area network such as a WiFi network. Thus the first and further device connect with each other, and hence authenticate each other, via the wireless personal area network, after which the selection of digital media is copied over a wireless local area network, which preferably is an ad-hoc network or a WiFi direct network, which does not require the wireless local area network to be connected to a telecommunication network such as the internet. Or, preferably, the actual copying takes place over a public telecommunications network, i.e. internet, via a central, remote, server. The server acts as a third party in the connection between the first and further device, to (temporarily, i.e. only to make copying possible, but not to maintain a copy on the server) store the digital content for making it available in the Camera Roll of the further device.

In a further example the method further comprises the step of defining, by the first mobile communication device, the time period for sharing the digital media, wherein the time period is defined by a start time value input by a user of the first mobile communication device, and, preferably, an end time value input by the user of the first mobile communication device.

The time period can be defined according to several methods. What is minimally required is a start time value to define the time period. The start time value makes sure that only files are copied, i.e. shared, that are directed to the shared activity, i.e. the joint holiday of the media share group participants. The method is in that case arranged to share those files from the date (and preferably, time on that date) set by the user of the first mobile communication device, i.e. the master user that makes the photos or videos with his or her device. The method will be arranged to share those files from the start time on forward without end time. In an alternative the end time value can also be set by the user of the first device. If both the start time value and the end time value are set, for example in the event that the user already knows when the joint activity will start and when it will end, the method is arranged to share those photos and videos for that exact time period. The actual sharing, i.e. the step of copying can also take place after the time period has ended. The time period is applied for defining the selection only, not for defining the period in which the digital media is copied.

Preferably, not only a time variable can be set, but also a location variable. Thus, the selection is determined by content generated during a period of time and within a certain range of a location, for example, 2500 meter of a longitude and latitude of a geo position at a festival.

In a further example the method further comprises configuration of the media share group, the configuration is comprised of the steps of:

creating, by the first mobile communication device, a new media share group;

adding, by the first mobile communication device, at least a further mobile communication device to the new media share group;

authenticating (pairing), by the first mobile communication device, a connection with the further mobile communication device by means of the wireless personal area network.

Prior to performing the connection, determining if the connected device belongs to the media share group, defining the selection of digital media to be copied, and finally copying the selection to the further device, the method is arranged to perform a configuration or registration process. In the configuration process a media group can be created. This group is defined on the first device and the mobile communication devices of other users can be added to the group once the group is created. These other group members, i.e. their (further) mobile communication devices have to authenticate mutual connection and communication. This connection and authentication process is performed over a wireless personal area network. In the case of Bluetooth™, the connection and authentication is known as pairing the first and further devices. Once the devices are paired, the connection can be established between the both devices in an automated manner once they come in each others personal area network range. In case of Bluetooth™ that range is approximately within 10 meters. In the alternative of copying the content via a public telecommunication network, authentication information, preferably anonymized, is stored on a remote server. The server can determine from the authentication information which devices have authenticated. Thus the information can comprise the actual (Bluetooth™) pairing key of the two devices, or a derivative. Moreover, the authentication information comprises information to which share group the user is registered, such that the server can determine with which device and to which group that particular device is registered. Once any of the users creates new content, i.e. digital media that belongs to the selection and has not yet been shared between the group members, the user can initiate the automatic uploading of the content to the server by activating the application running on the device. Once the server has received the new content, the server initiates a push message towards the further device(s) that belong to the same group, which indicate that new content is available. Then the user(s) of the further device(s) are informed and can activate the application which initiates the second part of the copying, i.e. the downloading of the new content to their device, i.e. the further device.

Every device, e.g. first and further, can create one or more groups and add one or more devices to that group. Thus, a device can be a master, i.e. first device in one group and target, i.e. further device in the group defined on the other device.

In a further example the configuration of the media share group further comprises the step of:

selecting, by the first mobile communication device, from the mobile communication devices comprised in the media share group, at least one further mobile communication device for copying the selection towards the at least one further mobile communication device.

As indicated, on each device the target devices, i.e. the further mobile communication devices, can be set on an individual basis. Thus, during configuration the target devices can be selected and deselected from the group.

In a further example the configuration of the media share group further comprises the step of:

de-selecting, by the further mobile communication device, the selection, by the first mobile communication device, from the mobile communication devices comprised in the media share group, the at least one further mobile communication device for copying the selection towards the at least one further mobile communication device.

Each user has control over its role as target. Hence, in a de-selection step the target device, i.e. the further device, can de-select its device as target device from the group defined by the master, i.e. de-select the further device from the group configuration of the first device, such performed from the further device. In other words, one can remove his or her device from another persons media share group.

In a further example the wireless personal area network is a Bluetooth™ network.

As indicated, the most preferred example of a wireless personal area network is a Bluetooth™ network. Other alternative are however also applicable (although some examples are often less available on standard modern mobile communication devices): Bluetooth™ LE, infrared, wireless USB, Z-Wave, ZigBee, or other IEEE 802.15 network standards.

In a further example the selection of the digital media is copied towards the further mobile communication device in an original format as generated by the camera module on the first mobile communication device, wherein the original format is preferably defined by any one or more of the group comprising: image and/or video resolution, video frames per second, compression method, file format, date and time, geographical location, and Exchangeable image file format (Exif) data. As an alternative, the content can also be copied in a different format, which is lower in size and thus requires less bandwidth. Preferably, the content can be put back into the original format once copied, such can be performed if lossless compression is applied. However, the copying can also be performed with a copy of the content which is still in its original file format but lowered in resolution and/or compression rate.

In a further example the first mobile communication device defines time periods for each of the further mobile communication devices of the media share group, respectively.

In a further example the first mobile communication device defines a time period for all of the further mobile communication devices of the media share group.

The time period can in an example be set for all group members, i.e. for all further devices or on an individual basis for each further device. If set for each device individually, it is advantageous in the event that the time period for the joint activity for the group members differs between the individual members. If for example one person will travel back from holiday earlier. Then it is advantageous to set the time period for that persons further device to the earlier date such that only the photos and videos of that period are shared.

In a further example the method further comprises the steps of:

displaying, by the first mobile communication device, to a user of the first mobile communication device, the selection of the digital media for copying towards the further mobile communication device;

receiving, by the first mobile communication device, from the user a chosen sub-selection of the displayed selection of the digital media;

copying, by the first mobile communication device, the chosen sub-selection towards the further mobile communication device by means of the wireless personal area network or alternatively, by means of a public telecommunication network.

In an example there is a further option to de-select photos or videos from the selection made by the first device. The selection made by the device is defined by the time period, location and origin of the file (if generate by the device itself and stored locally), and the user can then manipulate the selection by manually de-selecting certain files from the selection. For example personal photos or videos made during the joint activity but for personal use only and not intended to be shared with the group members.

In a further example the method further comprises the step of:

defining, by the first mobile communication device, an exclusion list comprising digital media stored on the non-volatile memory unit of the first mobile communication device which is excluded from copying from the first mobile communication device towards the further mobile communication device.

In an example the user of the first device can also define an exclusion list, i.e. a black list, of digital media that needs to be excluded from the selection and hence sharing. If several people for example go on a holiday together and only undertake joint activities during the evening and other individual activities during the day, the method provides for a step wherein only the files made during the evening are shared and the others are kept back/excluded from sharing. This could be performed by manual selection of the files already generated, or by defining an exclusion time period wherein files generated within that exclusion period are excluded from the selection and hence the sharing on an automated basis.

In a further example the method further comprises the step of:

logging, by the first mobile communication device, digital media copied from the first mobile communication device towards the further mobile communication device. In an example the method further logs each copy activity. That way debugging can be performed easily.

In a second aspect a computer program product is provided, loadable into non-volatile internal memory of a mobile communication device, wherein the computer program product comprises computer program code arranged for performing the method according to any of the previous descriptions.

In a further example the computer program product is carried on an electrical carrier signal.

In a further example the computer program product is downloadable from a server of a telecommunication network.

In a third aspect a computer-readable non-volatile storage medium is provided comprising computer program code arranged for performing the method according to any of the previous descriptions.

In a fourth aspect a mobile communication device is provided such as a smart phone or tablet, comprising non-volatile internal memory, on which computer program code is stored and arranged for performing the method according to any of the previous descriptions.

In a fifth aspect a digital distribution platform server is provided for apps on a mobile device, wherein said server comprises a non-volatile memory, being arranged for distribution of an application comprising a computer program product which comprises computer program code arranged for performing the method according to any of the previous examples of the first aspect.

In the following description of the drawing reference is made to the following:

100 illustration of users sharing digital media
111 first user
112 second user
113 third user
114 fourth user
115 fifth user
121 first device
122 second device
123 third device
124 fourth device
125 fifth device
131 first communication connection
132 second communication connection
133 third communication connection
134 fourth communication connection
140 wireless personal area network range of first device
200 step of the method of the present invention
210 first step of establishing connection
220 second step of determining media share group member
230 third step of defining selection of digital media
240 fourth step of copying selection

BRIEF DESCRIPTION OF THE DRAWINGS

The principals of the present invention will further be explained with reference to the attached drawings, wherein.

DETAILED DESCRIPTION

Figure 1:
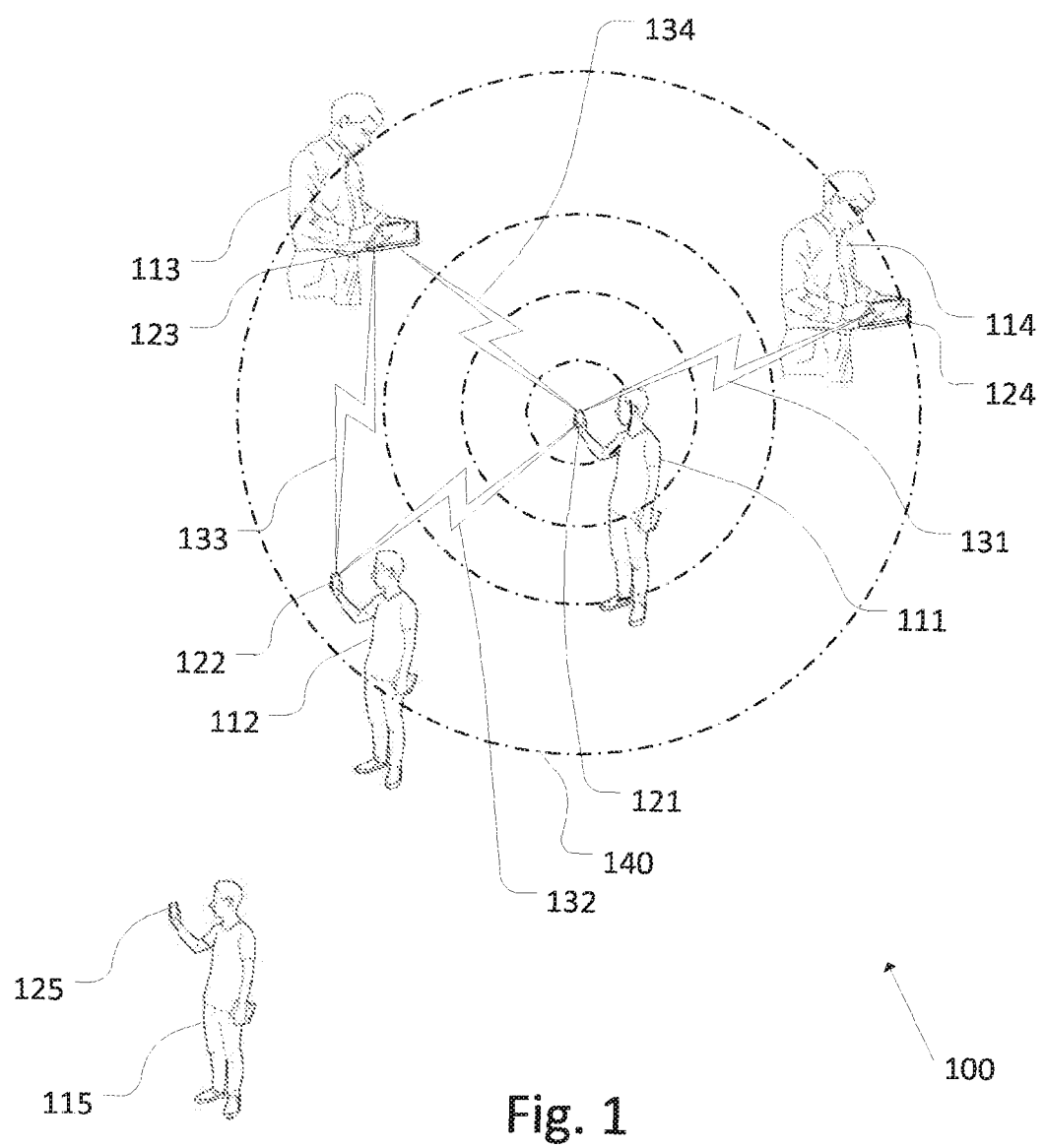
FIG. 1 illustrates a group of people using the method according to an example of the invention for sharing digital media between the several devices.

FIG. 1 illustrates a scene 100 wherein several users each with their own device intend to share content. The figure shows five users 111-115. The first user 111 holds a first mobile communication device 121, i.e. a smartphone in this case. The figure further shows a second user 112 which also holds a mobile communication device in the form of a smartphone, i.e. the second mobile communication device 122, or second device 122 for short, and accordingly a third 113 and fourth user 114 both holding a tablet as a third 123 and fourth 124 device.

The figure further shows a fifth user 115 holding a fifth device 125. All users communicate or intend to communicate or at least authenticate with each other over a wireless personal area network, Bluetooth™ or Bluetooth™ low energy, LE, in this case. A Bluetooth™ network is short range and is in particular in the order of 10 meters max. This range is illustrated in FIG. 1 with the dashed-doted circles which represent the maximum range 140 the Bluetooth™ module of the first device 121 can cover. Devices that are present within that range 140 are able to establish a connection, e.g. pair, with the first device 121. Devices that are outside the range are not. In FIG. 1 the second, third and fourth devices 122, 123, 124 are within the range 140 of the first device 121 and the fifth device 125 of the fifth user 115 is outside the range and thus at that location not able to pair with the other users 111-114.

In FIG. 1 the first user 111 and his smartphone 121 is shown in the centre of the figure. This illustrates that this device is the master device or first mobile communication device according to the invention. The first user 111 is for example on holidays abroad and joint by three friends, i.e. the second, third and fourth user 112-114. Whenever the first user makes a photo or video during that holiday, the other users may want to have a copy thereof. Known methods are only arranged to share that photo or video, i.e. digital media file, by copying it either via the internet or on a point-to-point basis with a single other users device.

Prior to sharing the content, the first user 111 can define a media share group, being a group of users, i.e. their devices, the first user perform the joint activity with, for example the holiday, and preferably a sub-selection of those people to only the people that are interested in receiving and sharing all digital media generated during the holiday by any of the group members.

Once the group is defined and thus its members are added, i.e. first master user 111 creates a first group of which the second, third and fourth user 112-114 form part of. In order to facilitate automatic sharing of content the first device 131 must be able to automatically connect with the second, third and fourth 122-124 device when the devices are within the Bluetooth™ range 140 of the first device 121. To facilitate the automatic connection, the first user and each of the other devices 122-124 have to authenticate each other on a one-on-one basis. Within the Bluetooth™ protocol this is known as pairing. Once the first device is paired with the second, third and fourth device respectively, the configuration is almost completed. The first user then only needs to define a time period on the first device, i.e. a time period that represents the time period of the holiday. This can be defined by only setting a start time and let the application run from that moment on forward, or set both a start and end time. In the first option the first user needs to halt the process of sharing the digital media on a manual basis, when the end time is set as well, this process will stop automatically at the right time.

Once time period, group, group members and pairing is completed, the method, implemented as application running on the first device, is arranged to run on the first device in the background. The application will be triggered or brought out of a pause or sleep state when a device is within Bluetooth™ range and is paired with, or when a push message is received from a central server that new content is available for download, e.g. via a public network like WiFi, 3G, 4G, etc. The application checks if the paired device is a device that belongs to the group, either from the devices themselves, or preferably through the server which holds information indicating which devices have authenticated and belong to the same group. If that is the case, the first device will access the non-volatile memory of the device and determine what photos, or what videos, or most likely, what photos and what videos are generated by the device itself within the time period that was defined. Those are the digital media files that have to be shared with the second, third and fourth user 112-114, respectively. Each device 122-124 that paired with, will receive those digital media files that fall within the time period and are generated by the first device 121. These files are known as the selection of digital media. Once all files of the selection have been copied from the master to the slave/target, i.e. from the first 121 to the further 122-124 devices either directly via a personal area network, or through a server via a public network, the sharing is complete.

If the first user will generate new content, i.e. a new set of photos, the next day, this new set has to be copied to the group members as well. If one or more of the further devices 122-124 are then again within the Bluetooth™ range 140 of the first device 121, the method steps are performed again by the application running on the first device 121. Alternatively, the new content can also, as indicated above, be shared over a public network, once within reach. Preferably, the application then performs an additional step of analysing which digital media files are already present on the further devices. For example all files made during the first day of the holiday where already copied to all devices except for the fourth device 124. Then the first device has to copy all files to the fourth device 124 and only the new files, e.g. the new set of photos, to the second and third device 122,123. Determining which files have to be copied can be performed by first determining all files within the predefined time period made by the first device, and stored locally on the non-volatile memory of the first device. Then determine all files within the predefined time period made by the first device and stored locally on the non-volatile memory of the second device and finally, define the selection that is to be copied on the basis of the difference in files on the first and second device.

In an alternative, the determination of which files have to be copied, thus analysing what files are new and what files have been copied previously, can also be performed solely from the master, i.e. the first device. If the first device is provided with a log file wherein the copy command of each file is logged, and preferably also if the file was copied successfully, the first device can determine the files stored locally that belong to the selection and then subtract those files that have been copied earlier on the basis of the log file. Then only that sub-selection has to be copied to the further device. This way it is prevented that files are copied twice or more and that more than one copy exist.

The time period can be set on a group or on a user basis. Thus a single time period can be defined for all devices or for each device individual. Moreover, the first user can always alter the group by adding or removing members and by performing a withdrawal request for one or more files. In the withdrawal process files generated by the first device will be removed from the further devices, i.e. on any one or more of the second, third and fourth device. The first user can also configure which files to keep back from sharing, for example by selecting certain files to be excluded, added to an exclusion list or on the basis of certain predefined time periods. If files are removed by the first user from the internal memory of the first device, those files will in principle, if shared prior to removing the files, remain on the internal memory of the further devices. Alternatively, the application can be configured to remove files on remote devices, i.e. on the further devices, once they are removed locally.

In the event that a set of photos and/or videos have been generated by the first device prior to for example the holiday, these files can preferably be added to the selection for sharing as well. In a configuration step, the first user can add those files to the selection that to not fall within the defined time period. This can be performed by a step of manual selection of individual files or by altering the time period such that those files will fall within the time period range.

The time period applies to the time stamp of the original files. Thus to for example a time value defined by Exif metadata of the photo or video. The time period preferably does not apply to the actual time of copying the files. This way files can still be copied from the first to the further device after the time period has ended en thus for example when the holiday is over.

In FIG. 1 the first user 111 and the first device 121 are the central devices in the sharing method. However, the second device 122 of the second user 112 is not only a target device for the first device 111, it can also be the master device, i.e. the first device according to the invention, for sharing content with the other users. In the examples previously illustrated the communication is point-to-multipoint communication on a single and not bi-directional basis from the first towards the second device, from the first towards the third device, and from the first towards the fourth device. The method can also be performed from the second device 122 towards the first device 121 and from the second device 122 towards the third device 123. Equal to the media share group of the first user on the first device, the second user can have an similar or different media share group on his own (second) device 122. This could, as indicated, be the same group having the same members, or a different group with different members or multiple groups, e.g. one similar to the group defined on the first device and a second group with different members.

For the first similar group the second device can also act as master, i.e. as first device. Prior to the step of actual copying, the second user 112 will configure the group and its members by for example confirming with the group configuration as defined by the first user 111, or by individually configuring a (new) group with certain group members. Then a time period is configured as well and authentication is performed with the individual group members, e.g. by Bluetooth™ pairing. Once these steps are performed, the application can run in the background. The application can come out of the sleep mode automatically or initiated by the operating system running on the device. The trigger for activating the application could be when a further device connects with the first device and this devices is determined as being part of the media share group. In an example the operating system of the first device can perform the geo-fence like activation signals. Geo-fencing currently implemented by operating systems of mobile communication devices works in such a way that they provide an activation signal towards the applications or a subroutine within the application, wherein the signal is generated when the device comes within the geographical range of a predefined location. In the present invention that location is not static, i.e. it is not a fixed geographical location but it corresponds to a location wherein the device is within Bluetooth™ range of further device. That is then the trigger to active the application and initiate the step of copying the selection of digital media. This could also be used when the actual copying is performed over a public instead of a personal network, e.g. the application can be triggered to copy the content when an internet connection is available, and when the device is within range of a predetermined geographical location.

Figure 2:
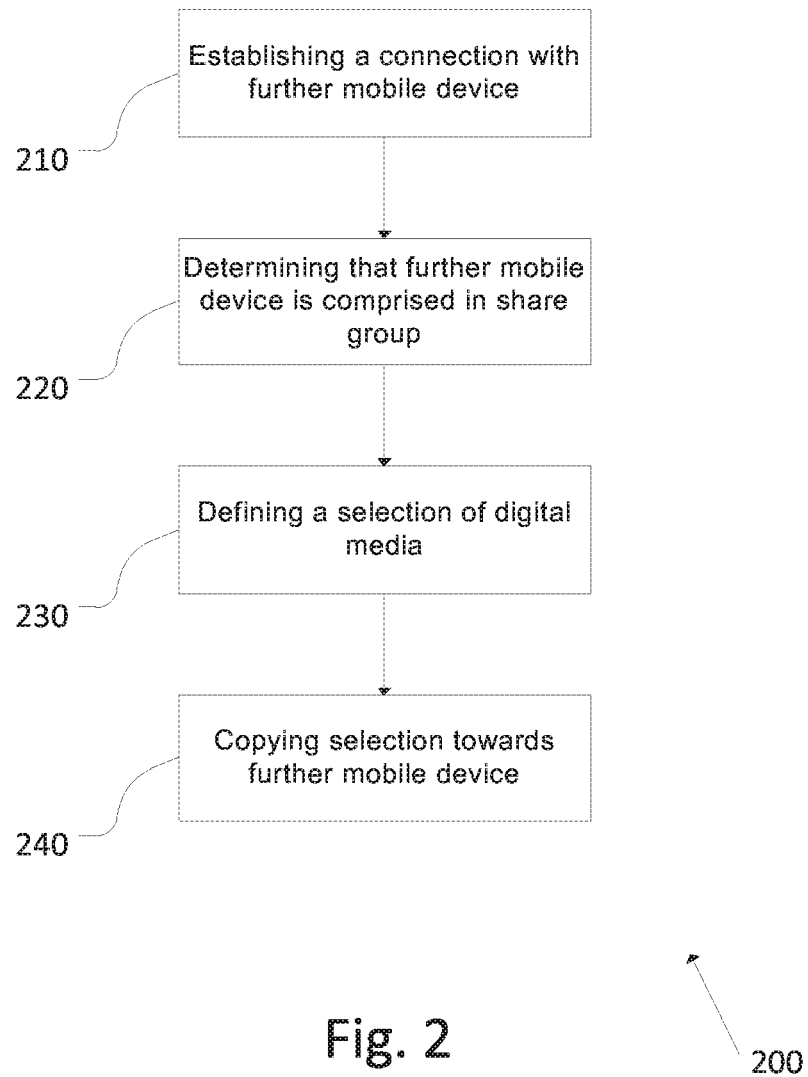
FIG. 2 illustrates the step of the method according to an example of the invention for sharing digital media between the several devices.

In FIG. 2 the different steps of a method of sharing digital media 200 according to the present invention are illustrated in a flow-chart like manner. These four blocks 210, 220, 230 and 240 represent the four steps in the most minimalistic embodiment of the present invention of sharing digital content/media such as photos and/or videos between several, e.g. two or more, camera module comprising mobile communication devices such as smartphones and/or tablets, wherein the digital media is present local on the internal non-volatile memory, i.e. the internal flash memory, of the device. The devices between which the digital media is shared are part of a media share group wherein each device is defined and authenticated for automatic connection over a wireless personal area network such as Bluetooth™ once within range, or over a public network once available.

In the first step 210, the master device, i.e. the first mobile communication device of the media share group connects with a target device, i.e. the further mobile communication device, by means of a wireless personal area network such as Bluetooth™. That connection is established from within the application itself, i.e. a Bluetooth™ sub-routine within the application, or via the operating system of the device. The connection is established automatically, i.e. without receiving user input, the moment the master and target device come within Bluetooth™ range. Alternatively, once the authentication over the wireless personal area network was successful, the authentication information (like the pairing key), or a derivate, can be stored on the central server. The server is aware which devices are thus authenticated, and to which group(s) they are registered. Once a network is available, Bluetooth™ or public network like WiFi, 3G, 4G, the server can determine which content is made available for download to the device, preferably, directly into the Camera Roll within the operating system.

In the second step 220, the master device determines if the target device belongs to the media share group. If that is the case, the master device will, in the third step 230, define what media files to copy. The files to be copied are considered the selection of digital media. To the selection only those digital media files belong that are generated by the camera module of the master device, thus photos or videos made by the first user, wherein the files are further limited to only those files that are made during a predefined time period. This is the share period, e.g. the time period wherein the joint activity such as the holiday takes place. Thus only photos and/or videos made by the first user, stored on the internal memory of the first device and made during the holiday are added to the selection.

In the fourth and final step 240 this selection of files is copied from the master device towards the target device, i.e. from the first towards the further device. The actual copying takes place over a wireless personal area network as well, e.g. over the same Bluetooth™ connection, or over a public network like WiFi/3G/4G.

Some or all aspects of the invention may be implemented in a computer program product, i.e. a collection of computer program instructions stored on a computer readable storage carrier or device for execution by a computer. The instructions of the present invention may be in any interpretable or executable code mechanism, including but not limited to scripts, interpretable programs, dynamic link libraries or Java classes. The instructions can be provided as complete executable program, as modifications to existing programs or extensions, e.g. plugins, for existing programs. Moreover, parts of the processing of the present invention may be distributed over multiple computers, processors or cores, such for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage medium or device, or may be offered or downloaded through HTTP, FTP or similar mechanism using a server connected to a network such as the internet. Transmission of the computer program product by other methods such as e-mail is of course also possible.

Throughout the description several times Bluetooth™ is indicated as an example of a network through which the copying of the content is performed. However, in each of these examples described it is considered clear for the skilled person that as an alternative, the actual copying can also take place over a public network like WiFi, 3G, 4G or any other (further generations) telecommunication networks. As such, throughout the description copying over Bluetooth™ is also to be interpreted as copying over a public network.

The skilled person will appreciate that the invention is not limited by the specific embodiments described within this specification and illustrated in the drawings, but may be practised otherwise. The scope of the invention is only determined by the appended claims.

The invention claimed is:

1. A method of sharing digital media between a plurality of mobile communication devices each comprising a camera module, wherein said digital media is a photo and/or video stored on a non-volatile flash memory module of any one of said plurality of mobile communication devices, wherein said plurality of mobile communication devices are comprised in a media share group at least comprising a first and further mobile communication device, said method comprising the steps of:
    establishing, by said first mobile communication device, a connection with said further mobile communication device by a wireless personal area network;
    determining, by said first mobile communication device, that said further mobile communication device is comprised in said media share group;
    defining, by said first mobile communication device, a selection of said digital media, wherein said selection is comprised of digital media not present on said non-volatile flash memory of said further mobile communication device and said digital media being generated by said camera module of said first mobile communication device within a predefined time period; and
    copying, by said first mobile communication device, said selection of said digital media towards said further mobile communication device.

2. The method of sharing digital media according to claim 1, wherein said step of copying is performed by said wireless personal area network.

3. The method of sharing digital media according to claim 2, wherein said wireless personal area network is a Bluetooth network.

4. The method of sharing digital media according to claim 1, wherein said step of copying is performed by a wireless local area network.

5. The method of sharing digital media according to claim 4, wherein said wireless local area network is an ad-hoc wireless local area network.

6. The method of sharing digital media according to claim 4, wherein said wireless local area network is a WiFi direct network.

7. The method of sharing digital media according to claim 1, wherein said method further comprises the step of:
    defining, by said first mobile communication device, said time period for sharing said digital media, wherein said time period is defined by a start time value input by a user of said first mobile communication device, and, preferably, an end time value input by said user of said first mobile communication device, and preferably,
    defining, by said first mobile communication device, a geographical area for sharing said digital media, wherein said geographical area is defined by a longitude and latitude as well as a radius thereof, input by a user of said first mobile communication device.

8. The method of sharing digital media according to claim 7, wherein said first mobile communication device defines time periods for each of said further mobile communication devices of said media share group, respectively.

9. The method of sharing digital media according to claim 7, wherein said first mobile communication device defines a time period for all of said further mobile communication devices of said media share group.

10. The method of sharing digital media according to claim 1, wherein said method further comprises configuration of said media share group, said configuration comprises the steps of:
    creating, by said first mobile communication device, a new media share group;
    adding, by said first mobile communication device, at least a further mobile communication device to said new media share group;
    authenticating or pairing, by said first mobile communication device, a connection with said further mobile communication device by means of said wireless personal area network.

11. The method of sharing digital media according to claim 10, wherein said configuration of said media share group further comprises the step of:
    selecting, by said first mobile communication device, from said mobile communication devices comprised in said media share group, at least one further mobile communication device for copying said selection towards said at least one further mobile communication device.

12. The method of sharing digital media according to claim 11, wherein said configuration of said media share group further comprises the step of:
    de-selecting, by said further mobile communication device, said selection, by said first mobile communication device, from said mobile communication devices comprised in said media share group, said at least one further mobile communication device for copying said selection towards said at least one further mobile communication device.

13. The method of sharing digital media according to claim 1, wherein said selection of said digital media is copied towards said further mobile communication device in an original format as generated by said camera module on said first mobile communication device, wherein said original format is preferably defined by any one or more of the group comprising: image and/or video resolution, video frames per second, compression method, file format, date and time, geographical location, and Exchangeable image file format (Exif) data.

14. The method of sharing digital media according to claim 1, said method further comprises the steps of:
    displaying, by said first mobile communication device, to a user of said first mobile communication device, said selection of said digital media for copying towards said further mobile communication device;
    receiving, by said first mobile communication device, from said user a chosen sub-selection of said displayed selection of said digital media; and
    copying, by said first mobile communication device, said chosen sub-selection towards said further mobile communication device by means of said wireless personal area network.

15. The method of sharing digital media according to claim 1, said method further comprises the step of:
    defining, by said first mobile communication device, an exclusion list comprising digital media stored on said non-volatile memory unit of said first mobile communication device which is excluded from copying from said first mobile communication device towards said further mobile communication device.

16. The method of sharing digital media according to claim 1, said method further comprises the step of:

logging, by said first mobile communication device, digital media copied from said first mobile communication device towards said further mobile communication device.

17. A computer program product embodied in non-transitory computer readable non-volatile internal memory of a mobile communication device, wherein said computer program product comprises computer program code arranged for performing the method according to claim 1.

18. The computer program product according to claim 17, wherein said computer program product is downloadable from a server of a telecommunication network.

19. A non-transitory computer-readable non-volatile storage medium comprising computer program code arranged for performing the method according to claim 1.

20. A mobile communication device such as a smart phone or tablet, comprising non-transitory computer readable non-volatile internal memory, on which computer program code is stored and arranged for performing the method according to claim 1.

21. A digital distribution platform server for apps on a mobile device, wherein said platform comprises a non-transitory computer readable non-volatile memory, being arranged for distribution of an application comprising a computer program product embodied on the non-transitory computer readable non-volatile memory which comprises computer program code arranged for performing the method according to claim 1.

* * * * *